United States Patent
Cheon

(10) Patent No.: US 10,538,184 B2
(45) Date of Patent: Jan. 21, 2020

(54) INTEGRATED FOAM TYPE HEADREST HAVING DIFFERENT HARDNESS, AND MANUFACTURING METHOD THEREOF

(71) Applicant: DAYOU HOLDINGS CO., LTD., Gwangju (KR)

(72) Inventor: Woojung Cheon, Gwangju (KR)

(73) Assignee: DAYOU HOLDINGS CO., LTD., Gwangju (KR)

( * ) Notice: Subject to any disclaimer, the term of this patent is extended or adjusted under 35 U.S.C. 154(b) by 208 days.

(21) Appl. No.: 15/534,922

(22) PCT Filed: Dec. 10, 2015

(86) PCT No.: PCT/KR2015/013519
§ 371 (c)(1),
(2) Date: Jun. 9, 2017

(87) PCT Pub. No.: WO2016/093640
PCT Pub. Date: Jun. 16, 2016

(65) Prior Publication Data
US 2017/0334708 A1    Nov. 23, 2017

(30) Foreign Application Priority Data

Dec. 12, 2014 (KR) .................. 10-2014-0178943
Feb. 17, 2015 (KR) .................. 10-2015-0023893

(51) Int. Cl.
*B60N 2/80* (2018.01)
*B60N 2/70* (2006.01)

(52) U.S. Cl.
CPC ............. *B60N 2/80* (2018.02); *B60N 2/7017* (2013.01); *B60N 2002/899* (2018.02)

(58) Field of Classification Search
CPC .. B60N 2/7017; B60N 2/80; B60N 2002/899; B68G 7/06; B68G 7/10
(Continued)

(56) References Cited

U.S. PATENT DOCUMENTS 3,824,199 A * 7/1974 Nadeau et al. ............ C08J 9/34
264/DIG. 14
5,085,487 A * 2/1992 Weingartner ............ B60N 2/00
297/452.1
(Continued)

FOREIGN PATENT DOCUMENTS

JP    5398187 B2    1/2014
JP    5527755 B2    6/2014
(Continued)

OTHER PUBLICATIONS

International Search Report dated Mar. 18, 2016 in counterpart International Patent Application No. PCT/KR2015/013519 (4 pages, with English translation).

*Primary Examiner* — Milton Nelson, Jr.
(74) *Attorney, Agent, or Firm* — NSIP Law

(57) ABSTRACT

The present invention relates to an integrated foam type headrest and a manufacturing method thereof. The headrest includes: a headrest cover; a cushion member which is attached to the inside of the cover before forming foam of a foam material, and is made of material having high elongation and low resistant resilience; a partition member, attached to the inside of the cushion member, for preventing the foam material from penetrating the cushion member; a stay frame for fixing the headrest to a sheet; and a foam material which surrounds the stay frame and is filled in the inside of the cover of the headrest by means of foamforming. Accordingly, even though a cushion member having a thickness of 10 mm or more is installed to satisfy the softness properties of the headrest, the cushion member can be stably adhered to the cover, and can be reliably installed even at a curved part. Furthermore, sewing convenience is achieved, and thus mass production is possible.

9 Claims, 14 Drawing Sheets

(58) Field of Classification Search
USPC ..... 297/DIG. 1, DIG. 2, 391; 264/46.4, 46.6
See application file for complete search history.

(56) References Cited

U.S. PATENT DOCUMENTS

| | | | | |
|---|---|---|---|---|
| 6,237,173 | B1 * | 5/2001 | Schlichter | A47C 27/144 |
| | | | | 5/722 |
| 6,663,734 | B2 * | 12/2003 | Takei | B29C 44/143 |
| | | | | 156/247 |
| 2003/0181538 | A1 * | 9/2003 | Martel | B29B 17/0005 |
| | | | | 521/50 |
| 2004/0209744 | A1 * | 10/2004 | Tsujimoto | A63B 69/004 |
| | | | | 482/83 |
| 2015/0010728 | A1 * | 1/2015 | Tabata | B60N 2/58 |
| | | | | 428/71 |

FOREIGN PATENT DOCUMENTS

| | | | | |
|---|---|---|---|---|
| KR | 10-2000-0036796 A | 7/2000 | | |
| KR | 10-0636600 B1 | 10/2006 | | |
| WO | WO-2014103836 A1 * | 7/2014 | ........... | B60N 2/5883 |
| WO | WO 2014/122170 A1 | 8/2014 | | |

* cited by examiner

INTEGRATED FOAM TYPE HEADREST HAVING DIFFERENT HARDNESS, AND MANUFACTURING METHOD THEREOF

CROSS-REFERENCE TO RELATED APPLICATIONS

This application is a U.S. national stage application of International Application No. PCT/KR2015/013519 filed on Dec. 10, 2015, and also claims the benefit under 35 U.S.C. Section 119 of Korean Patent Application Serial No. 10-2014-0178943 filed Dec. 12, 2014 and No. 10-2015-0023893 filed Feb. 17, 2015, which are hereby incorporated by reference in their entirety into this application.

TECHNICAL FIELD

The present invention relates generally to an integrated foam type headrest. More particularly, the present invention relates to an integrated foam type headrest having different hardness parts, and a manufacturing method thereof, wherein a cushion part and a main body of the headrest can be manufactured in an integrated foam type, thus providing a headrest having parts with different hardnesses.

BACKGROUND ART

In general, a headrest is designed to be installed on the driver's seat and the passenger's seat of the vehicle to support the head of the driver or passenger so that the head can be rested while preventing the head from being tilted back and forth in sudden unintended accelerations or accidents.

In a conventional headrest, the headrest is manufactured by inserting or injecting a flexible polyurethane, which is a foam material excellent in cushioning property, into a skin material sewn using a fabric having air permeability. As shown in FIG. 1, such a headrest is made by sewing the skin material by using the fabric in a shape the same as that of the headrest, inserting a stay frame into the headrest, the stay frame having a finishing material for finishing a lower end portion of the headrest, and then injecting the flexible polyurethane foaming liquid into the skin material through an injection port at a center of the finishing material. The urethane foaming liquid injected into the skin material hardens after a certain period of time, thereby forming the shape of the headrest.

In order to ensure the user's comfort as well as his/her safety in the event of a car accident, the headrest is integrally provided with the stay frame such that cushioning function is enhanced at a portion where the user's head is rested while maintaining a certain degree of strength, such that the user's comfort and the safety can be secured at the same time. In the case of the above-described prior art, since the headrest is integrally foamed with the skin material and the stay frame, the manufacturing method is simple and the production cost is reduced. However, there is a problem in that the stability and comfort of the user are reduced because the portion where the user's head is rested has the same hardness as that of the other portions.

In an effort to solve such a problem, as shown in FIG. 2, recently, a method of manufacturing an assembly-type headrest has been proposed. The method of manufacturing the headrest is a method in which the flexible urethane (hereinafter, referred to as a "main body") is foamed and then a cushion member is assembled to the portion where the user's head is rested. Generally, the flexible polyurethane for headrests has a density of 0.040 to 0.065 g/cm3.

However, according to the above-described conventional assembly method, a soft cushion member is used at the portion where the user's head is rested to improve the comfort and safety of the user, compared to providing a cushion member prepared by the conventional method of manufacturing the integral foam type headrest. However, there is a problem in that that it takes a much time and expense for processes after the foaming, such as finishing of the foamed the main body of the headrest, cutting of the main body, insertion of the cushion member, attaching of a tape to the cushion member, etc. In addition, since the tape must be attached to the cushion member, as shown in FIG. 3, a loosening phenomenon occurs between a headrest cover and the cushion member as illustrated in part A. Further, creasing may occur in the headrest cover, which may easily cause defective packaging, and there is a high possibility that the portion where the user's head is rested may protrude. Moreover, the assembly-type method does not provide a satisfactory effect for the passenger even when the cushion member having a thickness of equal to or greater than 15 mm is used.

Meanwhile, in recent years, in order to provide comfort and softness in addition to stability at the portion where the user's head is rested, softness properties are increasingly required as the cushion member. Accordingly, in order to satisfy such high softness, a cushion member having a thickness of equal to or greater than 10 mm is required.

However, the conventional integrated foam type headrest is problematic in that it is very difficult to attach a cushion member equal to or greater than 10 mm in thickness. In other words, when a cushion member having a thickness of equal to or greater than 5 mm is attached, the difference in elongation of a material (fabric, artificial leather, natural leather, etc.) and the cushion member is large, and thus neither can a good appearance nor a stable cushioning function be provided.

In addition, although attempts have been made to increasing the softness by increasing a thickness of a sponge used for the headrest cover, the sewing ability due to thickening of the cover becomes difficult and also appearance defects occur due to the characteristics of the integral foam type headrest. Further, the foam material is absorbed and hardened due to hygroscopicity of the cushioning member, thereby causing a phenomenon that softness of the cushioning member becomes significantly lowered over time.

Further, a sponge may be provided inside the cushion member so as to prevent the foam material from being absorbed to the cushion member. In this case, however, as shown in FIG. 5, the sponge for preventing absorption presses the cushion member at a curved part of the headrest, thereby causing creasing B, and thus softness properties at the creasing B are significantly lowered, and the passenger feels discomfort when leaning his/her head, which leads to a problem that the mass productivity and quality of the headrest are greatly deteriorated.

Vehicle headrests can be manufactured in various shapes. In particular, when the headrest is made of a curved headrest as shown in FIG. 4, the above-described problems may remarkably appear.

DISCLOSURE

Technical Problem

Accordingly, the present invention has been made keeping in mind the above problems occurring in the prior art, and an object of the present invention is to provide an integrated foam type headrest and a manufacturing method thereof, wherein when the headrest is manufactured, a cushion member having a certain softness at a cushion part of the headrest where the user's head is rested, and a headrest body is formed by foaming a foam material, whereby the cushion part and the main body of the headrest are manufactured in an integrated foam type without a finishing process thus providing a headrest having parts with different hardnesses, and thus the headrest can be easily manufactured and can provide user comfort and stability.

Another object of the present invention is to provide an integrated foam type headrest and a manufacturing method thereof, wherein even though a cushion member having a thickness of equal to or greater than 10 mm is used to satisfy increasingly required soft properties of the headrest, the cushion member can be reliably bonded to the headrest cover and can be stably installed at the curved portion, and thus sewing convenience is achieved and mass production is possible.

Technical Solution

In order to accomplish the above object, the present invention provides an integrated foam type headrest having different hardness parts, the headrest including: a headrest cover; a cushion member being made of a material having high elongation and low rebound resilience, and being attached to an inner surface of the cover before foaming of a foam material; a partition member attached to an inner surface of the cushion member and preventing the foam material from penetrating into the cushion member; a stay frame mounting the headrest to a seat; and the foam material surrounding the stay frame and filled in the headrest cover by foaming.

Advantageous Effects

According to the present invention having the above-described configuration, when a headrest is manufactured, a cushion member having a certain softness is provided at a cushion part of the headrest where the user's head is rested, and a main body of the headrest is formed by foaming a conventional foam material. Thus, the cushion part and the main body can be manufactured in the integrated foam type without the finishing process, thus providing a headrest having parts with different hardnesses. Thus, the headrest can be manufactured easily, the manufacturing cost can be reduced by reducing the assembly cost, and user comfort and stability can be secured.

Further, even though a cushion member having a thickness of equal to or greater than 10 mm is used to satisfy the increasingly required softness properties of the headrest, it can be reliably attached to the headrest cover and can be stably installed at the curved part. Thus, sewing convenience is achieved and mass production is possible.

Further, a headrest made of leather such as natural leather or artificial leather can be manufactured in the integrated foam type.

DESCRIPTION OF DRAWINGS

FIGS. 12 and 13 are views showing a loosening phenomenon of the cushion member, wherein FIG. 12 is a plan view showing a conventional headrest, and FIG. 13 is a plan view showing the arrangement of the cushion member of the headrest according to the present invention.

BEST MODE

Figure 1:
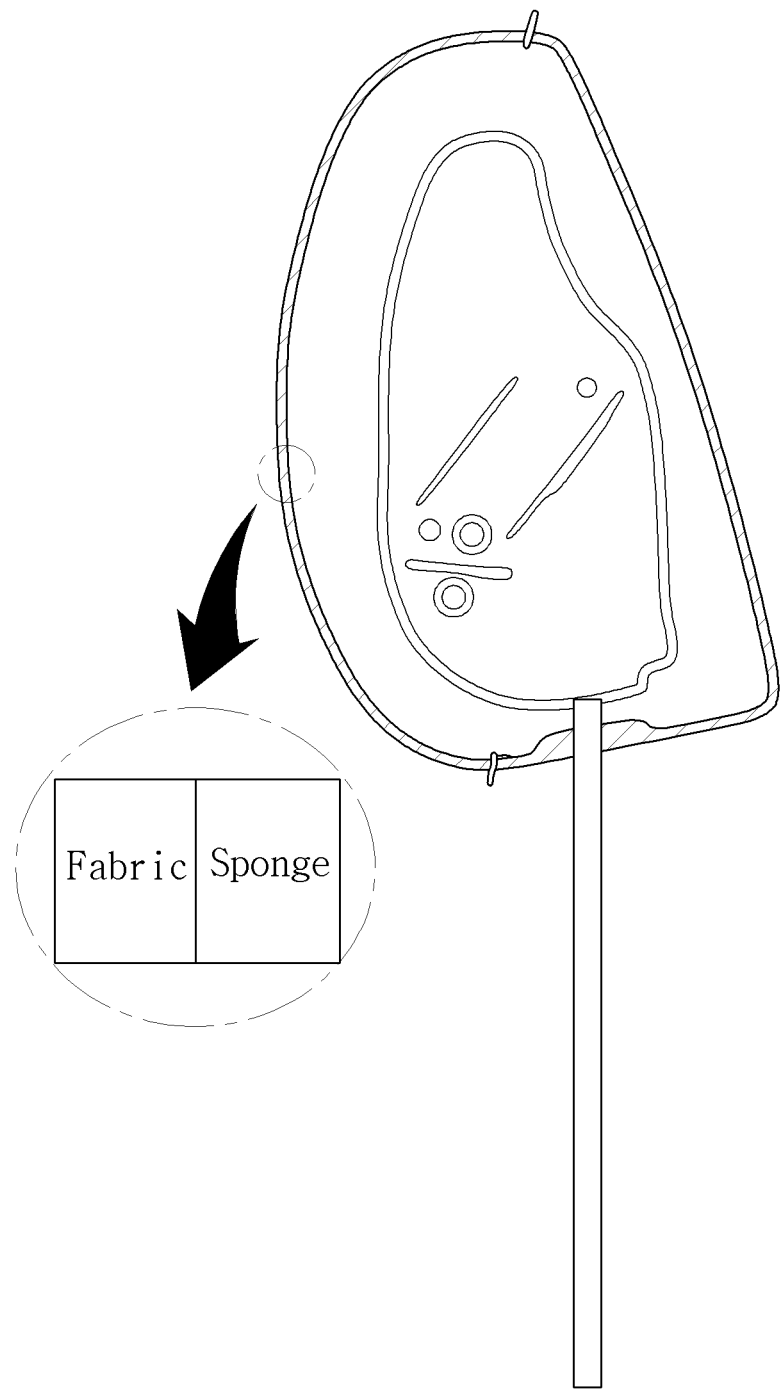
FIG. 1 is a view showing a headrest manufactured by a conventional an integrated foam method.
Figure 2:
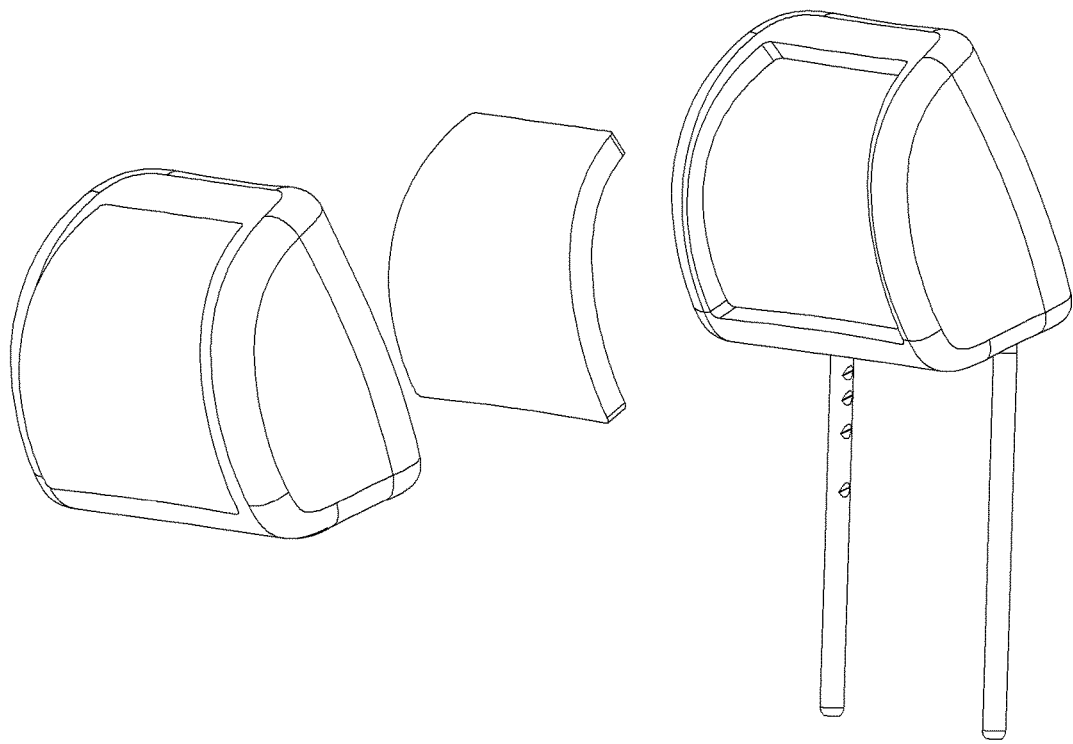
FIG. 2 and FIG. 3 are views showing a headrest manufactured by a conventional assembly method.
Figure 3:
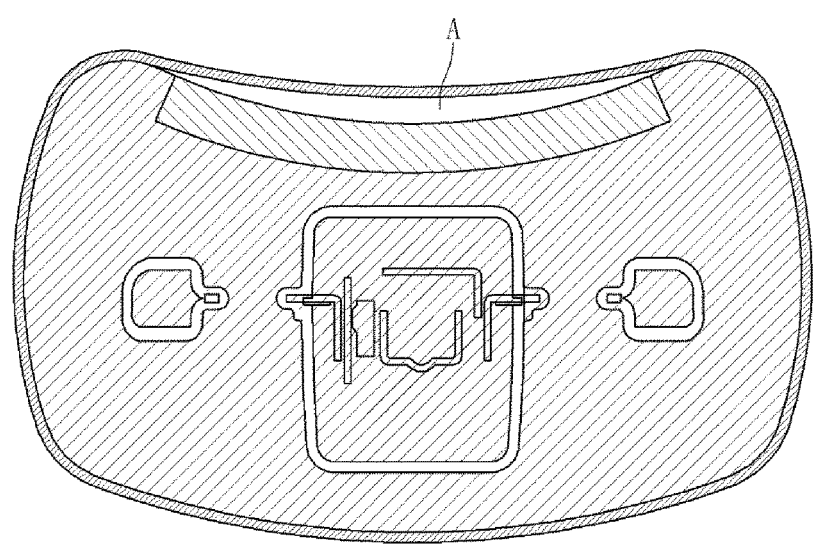
Figure 4:
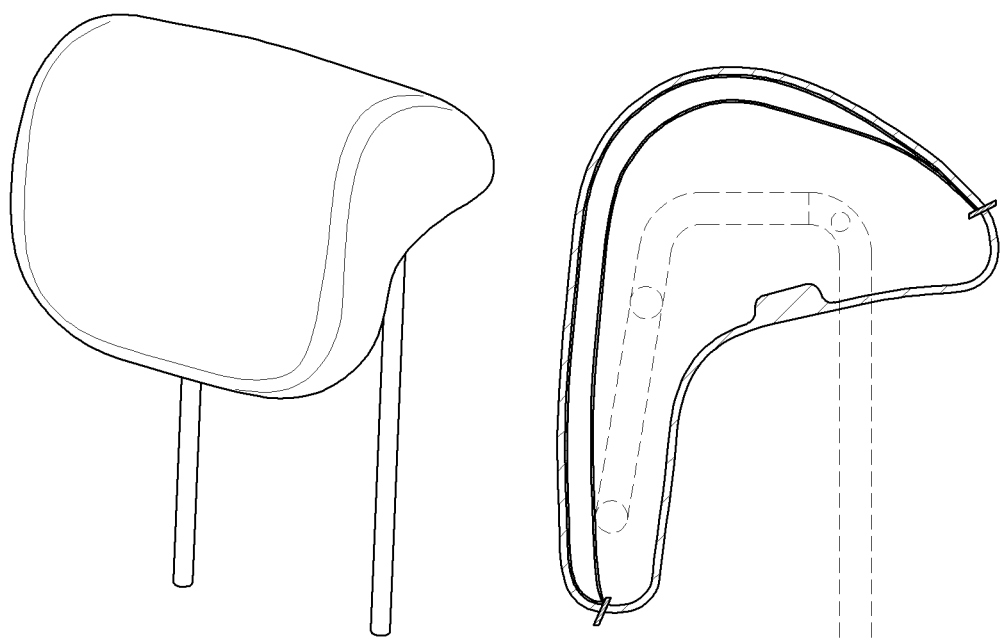
FIG. 4 is a view showing an example of a curved headrest.

An integrated foam type headrest having different hardness parts according to the present invention includes: a headrest cover; a cushion member being made of a material having high elongation and low rebound resilience, and being attached to an inner surface of the cover before foaming of a foam material; a partition member attached to an inner surface of the cushion member and preventing the foam material from penetrating into the cushion member; a stay frame mounting the headrest to a seat; and the foam material surrounding the stay frame and being filled in the headrest cover by foaming.

Here, the cushion member is a memory foam having high elongation and a rebound resilience of 5 to 15%, or is a sponge having high elongation and a rebound resilience of equal to or less than 50%. A typical sponge has high hardness at high density, but a typical memory foam has low hardness at high density, and has high elongation.

Here, the partition member is made of a heat-resistant material, and has a thickness of 20 to 50 μm.

Here, the headrest cover is made of natural leather or artificial leather, and the cushion member is attached to the headrest cover by sewing at an edge of the cushion member without being bonded to the headrest cover by using adhesive.

A method of manufacturing an integrated foam type headrest having different hardness parts according to the present invention includes: preparing a cushion member provided at a portion where a user's head is rested, the cushion member comprising a memory foam or a sponge having high elongation and low rebound resilience; attaching the cushion member to an inner surface of a headrest cover; inserting a stay frame into the headrest cover with the cushion member attached thereto, and inserting and fixing the headrest cover to a headrest mold; mounting an end cover to the headrest cover; and injecting a foam material into the headrest cover and foaming the cushion member and the headrest integrally, followed by demolding.

Here, the attaching of the cushion member to the headrest cover is performed by applying a solid state adhesive and attaching the cushion member to the headrest cover by placing the cushion member at a predetermined position on the headrest cover, and then heating the cushion member and the headrest cover, such that the cushion member is bonded to the headrest cover without positional deviation.

Here, the preparing of the cushion member further includes attaching a partition member to the cushion member at a position between the cushion member and the foam material to be foamed, thereby preventing the foam material from penetrating into the cushion member.

Here, the attaching of the partition member may be performed by applying a solid state adhesive and attaching the partition member to the cushion member and or to the headrest cover by placing the partition member at a predetermined position on the cushion member or on the headrest cover, and then heating the partition member and the cushion member or the headrest cover, such that the partition member is bonded to the cushion member or to the headrest cover without positional deviation.

Here, the attaching of the cushion member to the headrest cover includes: pre-bonding the cushion member to the headrest cover by heating at a high temperature for a short period of time in a vertical thermal bonding apparatus; and final-bonding the cushion member and the headrest cover to each other by pressurizing the cushion member and the headrest cover after drawing the cushion member and the headrest cover that are pre-bonded to each other out of the vertical thermal bonding apparatus by using a transfer device, followed by cooling.

MODE FOR INVENTION

Hereinafter, a method for manufacturing an integrated foam type headrest having different hardness parts according to the present invention and a headrest manufactured by the method will be described in detail with reference to the accompanying drawings.

As shown in FIGS. 6 to 14A-14D, the integrated foam type headrest 1 having different hardness parts according to the present invention includes a headrest cover 10, a cushion member 20, a stay frame 50, and a foam material 40.

The headrest cover 10 uses fabrics typically used as the skin of the headrest, but may use any material that is applied to the headrest cover such as leather or the like without being limited thereto. The headrest cover 10 is provided at a lower end portion thereof with an opening into which the stay frame is inserted, which will be described later.

The cushion member 20 is attached to an inner surface of a portion of the headrest cover 10 where the user's head is rested. The cushion member 20 is made of a soft material, such that the user can feel comfort when his/her head is rested on the cushion member 20, and the cushion member 20 can relieve the shock on impact.

As described above, it is necessary to provide a cushion member having a thickness of equal to or greater than 10 mm in order to satisfy the increasingly required softness properties of the headrest. In this case, due to the thickness of the cushion member, it is difficult to mass-produce the headrest cover because it is difficult to sew the headrest cover, and creasing occurs as shown in FIG. 5.

In order to solve the above-described problems, it is necessary to secure a space to allow sewing by spacing a certain distance between an outer line of the cushion member 20 and a sewing line 60. In addition, the cushion member 20 may be made of a material having high elongation and low rebound resilience. The cushion member 20 having low rebound resilience may be, for example, a memory foam or a low elastic sponge member.

Figure 5:
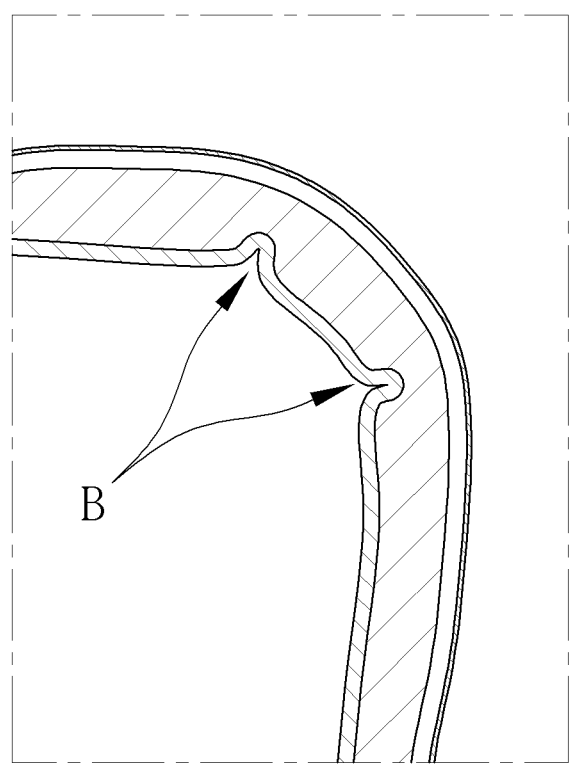
FIG. 5 is a view showing creasing at a curved part of the headrest.
Figure 6:
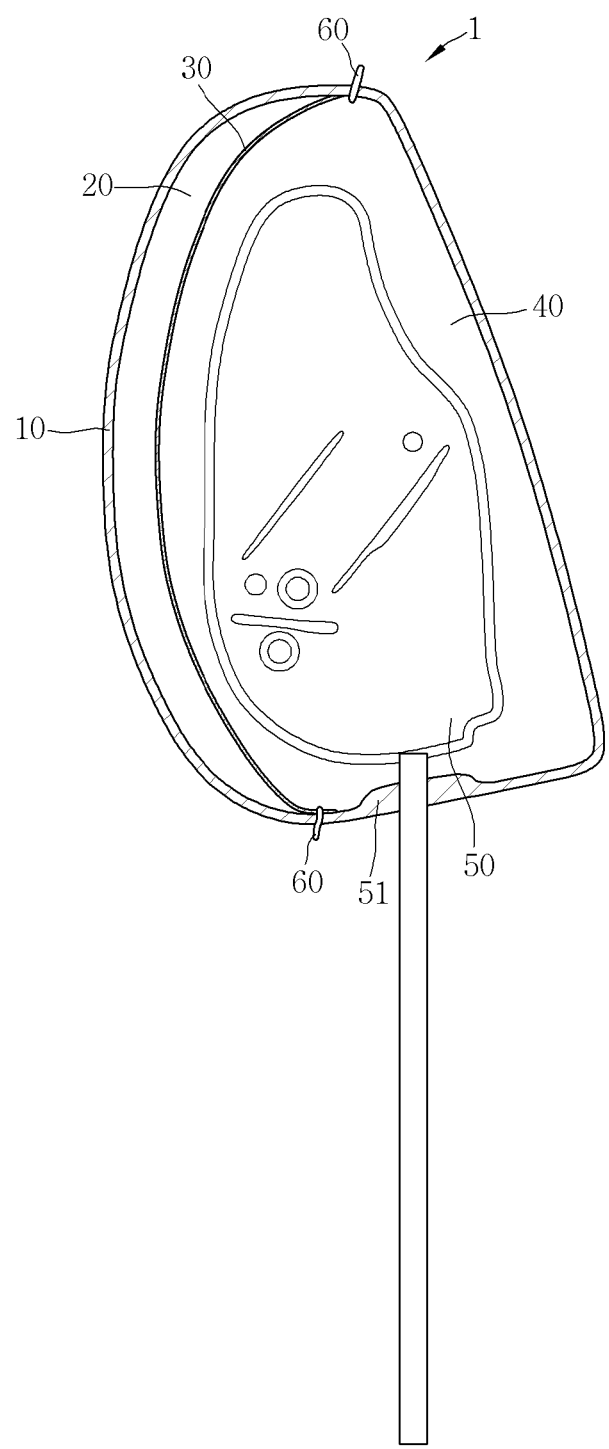
FIG. 6 is a cross-sectional view showing an integrated foam type headrest according to the present invention.
Figure 7:
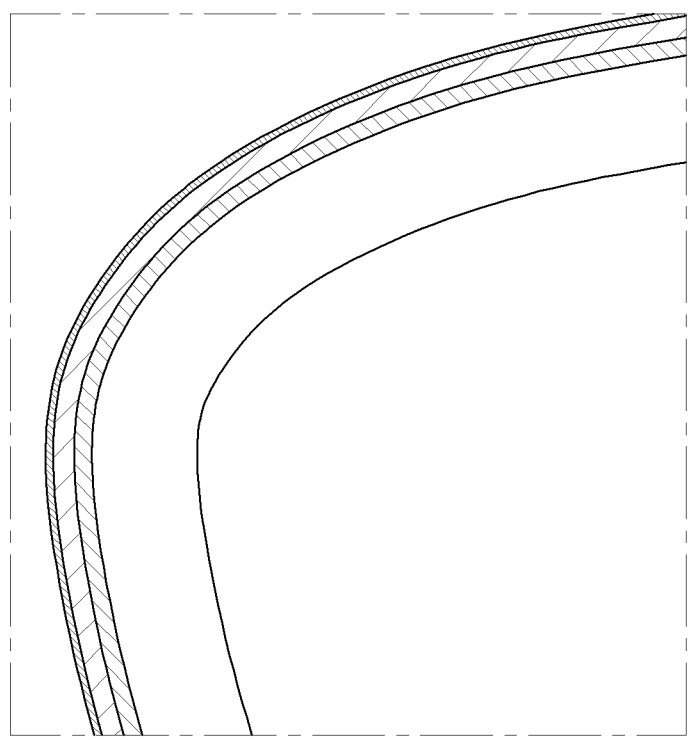
FIG. 7 is a cross-sectional view showing a curved part of the headrest according to the present invention.

When the cushion member 20 is made of the memory foam, even if the memory foam has a size of equal to or greater than 10 mm, desired flexibility is provided in a curved part of the headrest as shown in FIG. 7, and thus occurrence of creasing as shown in FIG. 5 can be prevented.

Figure 12:
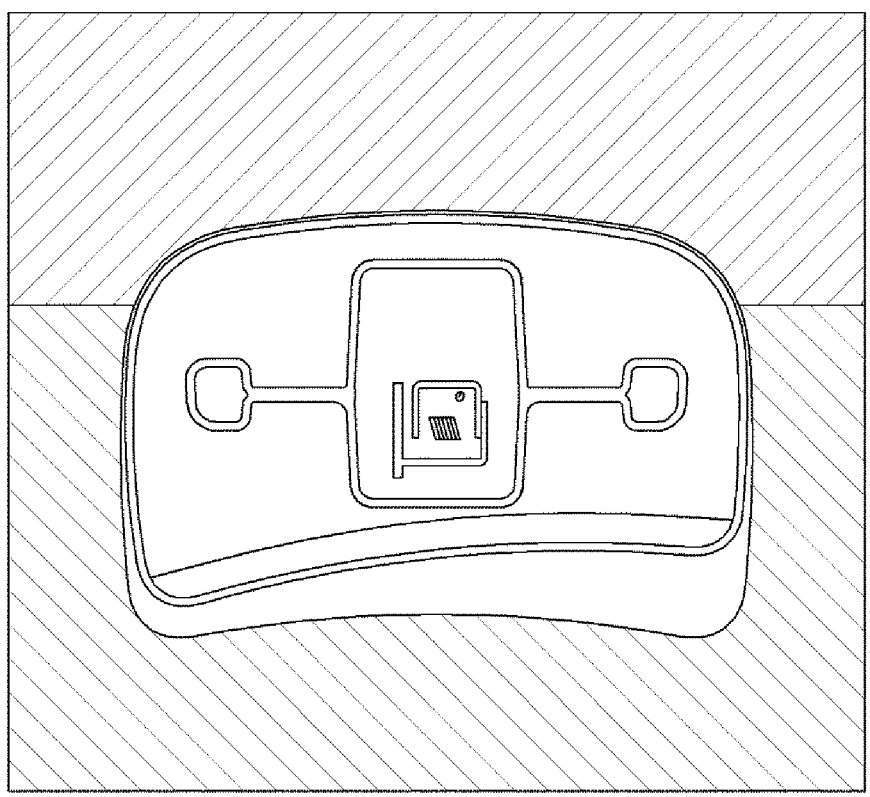
Figure 13:
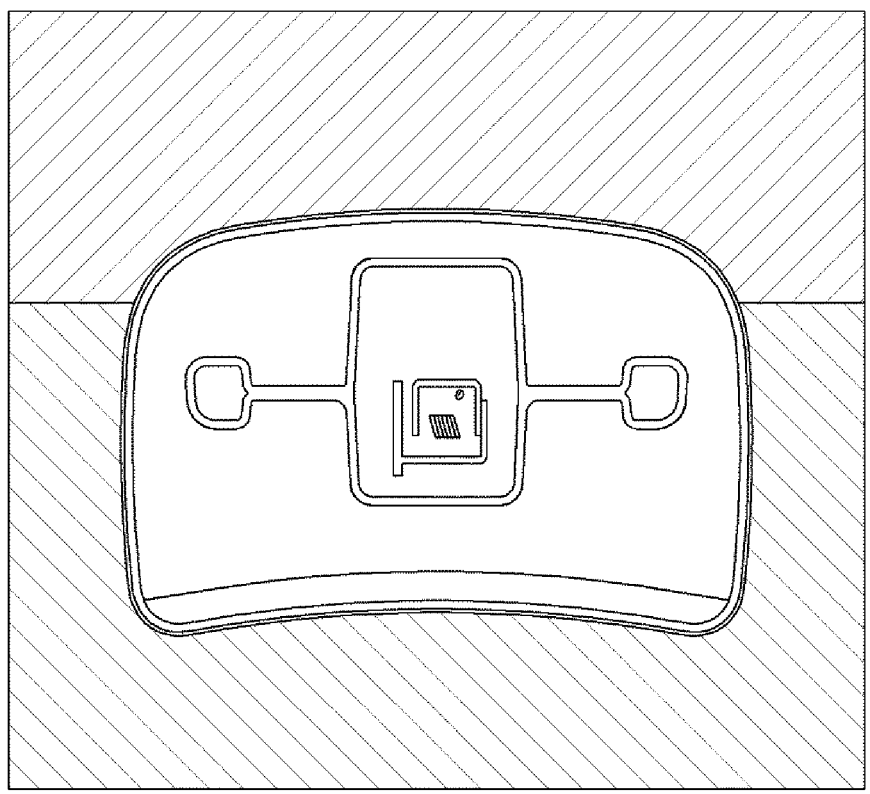
Figure 14A:
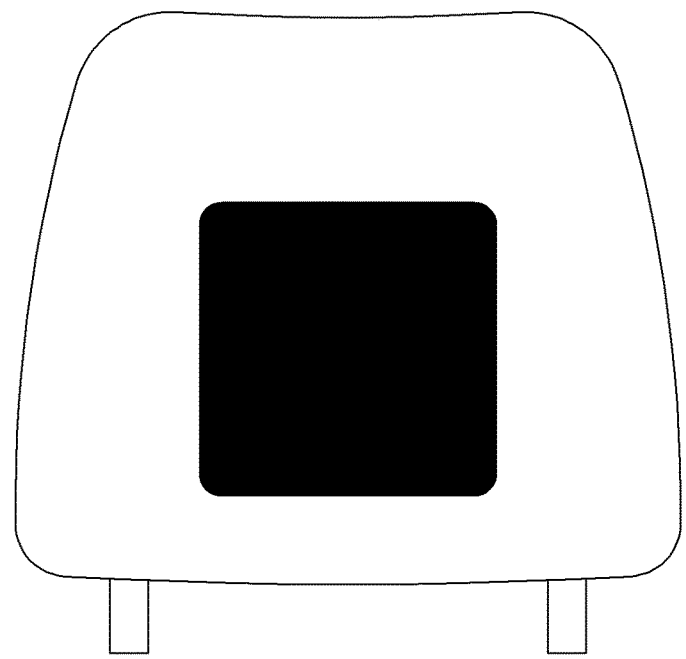
FIGS. 14A to 14D are schematic views showing various arrangements of cushion member according to the present invention.
Figure 14B:
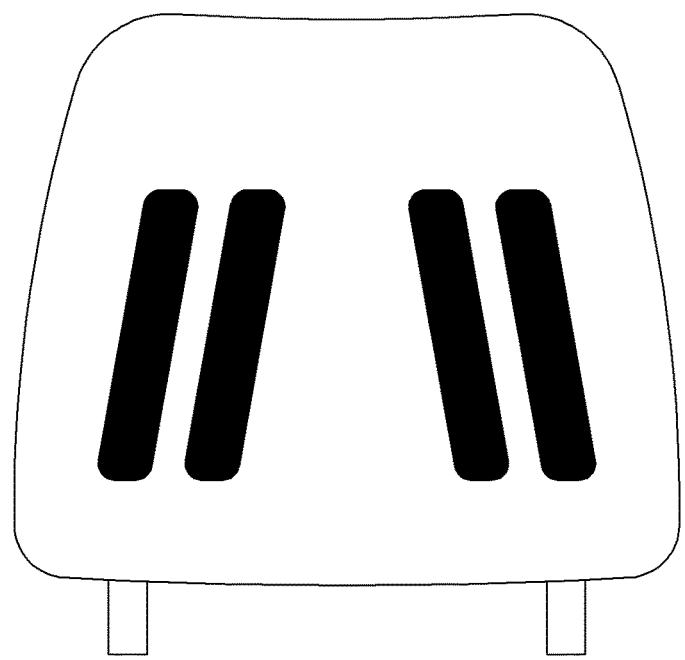
Figure 14C:
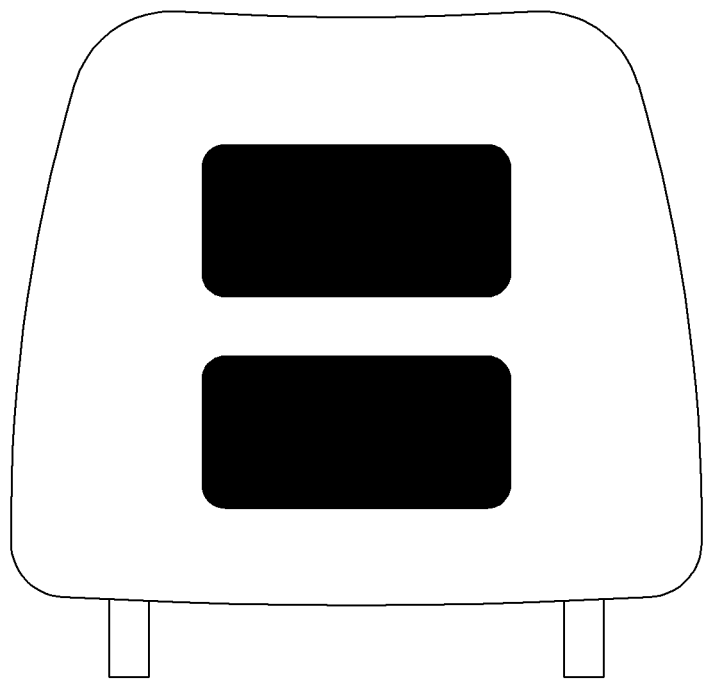
Figure 14D:
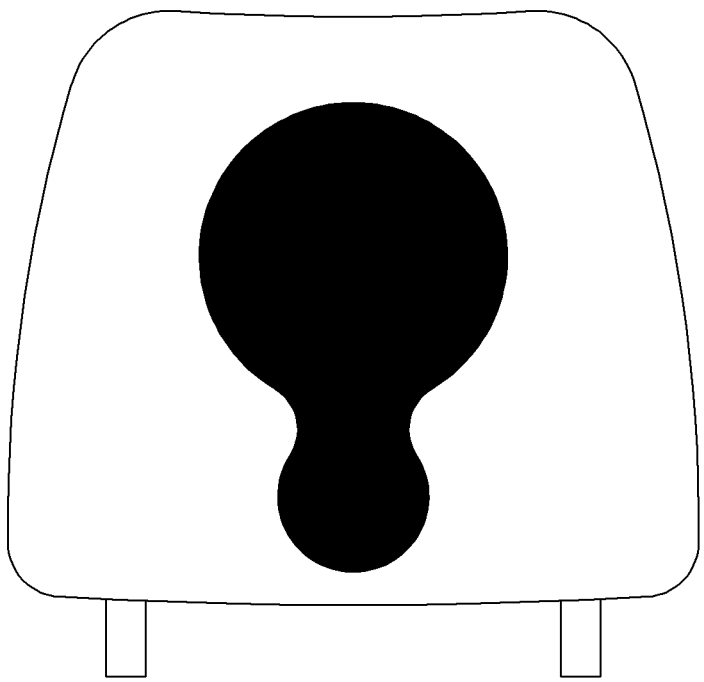

In addition, the cushion member 20 is made of a low-resilience soft member, such that the cushion member can be stably installed in a headrest frame. In other words, when the cushion member is made of a material having good resilience as in the prior art, as shown in FIG. 12, the cushion member becomes loose in the headrest frame, which causes defects. However, when the cushion member according to the present invention is made of the memory foam having low rebound resilience, as shown in FIG. 13, the cushion member can be stably installed without loosening in the headrest frame when the headrest is manufactured.

In this embodiment, the memory foam may be a memory foam having a rebound resilience of 5 to 15%, and the sponge member may be a sponge having a rebound resilience of equal to or less than 50%, which comprise the cushion member 20.

The cushion member 20 is provided with a partition member 30 attached thereto as a cushion protecting material. The partition member 30 is provided at a position opposite to a side of the cushion member 20 where the cushion member 20 is attached to the headrest cover 10, that is, at a position between the cushion member 20 and the foam material that will be described later.

In view of the nature of the cushion member 20, the cushion member is hardened at a portion of a surface thereof where the foam material is in contact with and impregnated with the cushion member. In order to prevent impregnation of the foam material with the cushion member, a method of attaching a non-air permeable sponge or the like to the cushion member may be proposed. However, the non-air permeable sponge is problematic in that creasing may occur at a curved part of the cushion member as shown in FIG. 5.

In the present invention, the partition member 30 is made of a thin film having stable heat resistance without being deformed at a high temperature, such that the foam material that will be described later can be prevented from penetrating into the cushion member 20. In Particular, the partition member 30 may have a thickness of equal to or less than 50 μm, preferably 20 to 50 μm, and thus may have heat resistance at a high temperature while being thin. If the film has no heat resistance, the film is deformed or holes are generated on the film when heat is applied by the thermal bonding apparatus, which may become a factor of defects.

Figure 8:
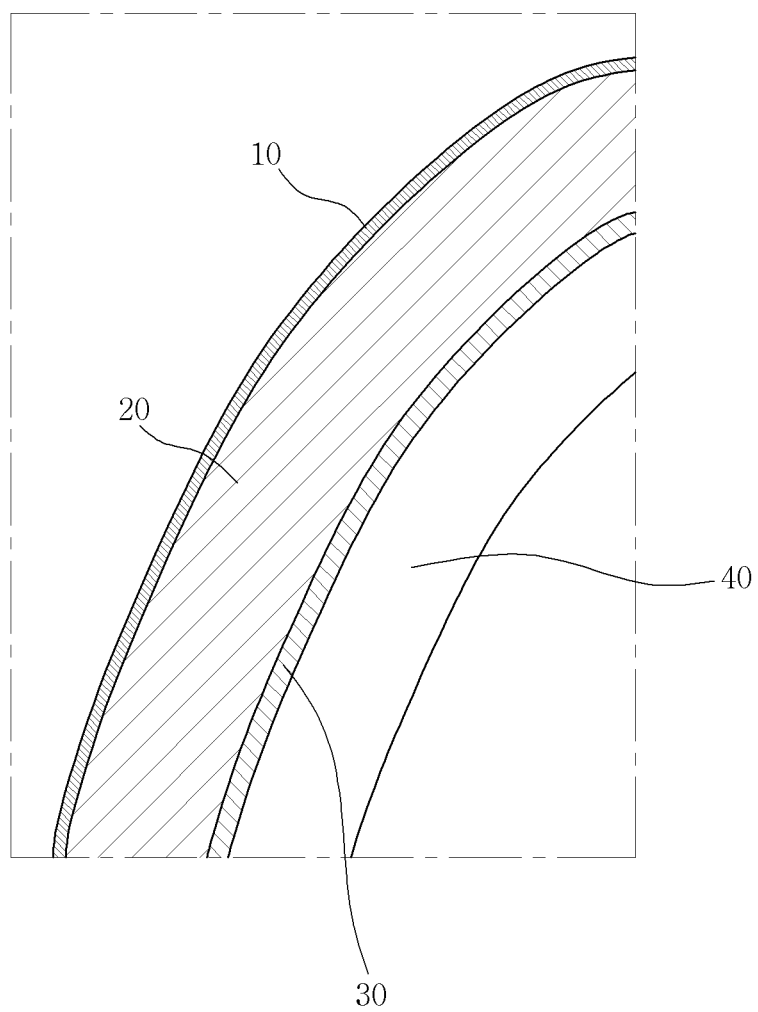
FIG. 8 is an image showing a cross section of the integrated foam type headrest according to the present invention after foaming.
Figure 9:
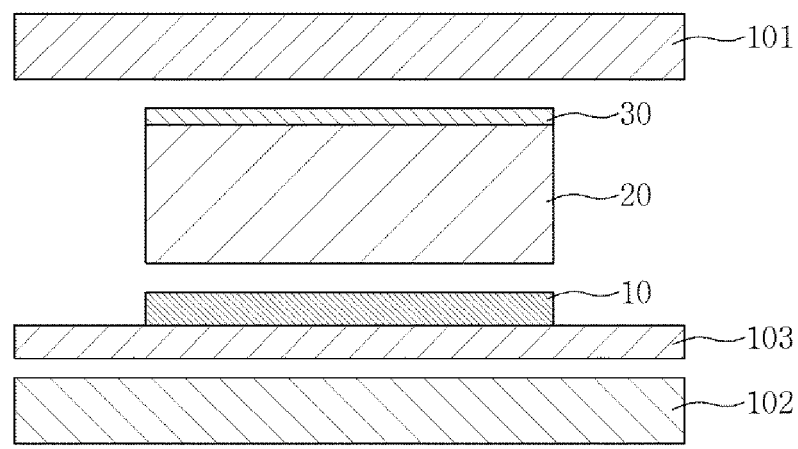
FIG. 9 is a schematic view showing a thermal bonding apparatus for attaching of a cushion member of the headrest according to the present invention.

FIG. 8 shows a cross-sectional image obtained by attaching the partition member as described above to the cushion member, foaming the foam material. As shown in FIG. 8, in the headrest according to the present invention, a user can feel the softness and stability of the headrest by the cushion member made of the memory foam having a thickness of equal to or greater than 10 mm, and the foam material can be stably prevented from penetrating into the cushion member by the partition member, thereby achieving an improved softness properties of the headrest.

The stay frame 50 is inserted into the headrest cover 10. The stay frame 50 serves to mount the headrest to a seat back of a vehicle.

Further, the foam material 40 is injected into the headrest cover 10. For example, the foam material 40 such as urethane foam liquid, is injected and foamed, and then is filled in the headrest cover 10 while surrounding the stay frame 50.

Hereinafter, a method of manufacturing an integrated foam type headrest having different hardness parts according to the present invention will be described.

In the method of manufacturing the integrated foam type headrest having different hardness parts according to the present invention, first, a cushion member 20 provided at a portion where the user's head is rested is prepared.

In the preparing of the cushion member, a partition member is attached to the cushion member at a position between the cushion member and the foam material to be foamed, thereby preventing the foam material from penetrating into the cushion member.

Here, the attaching of the partition member may be performed by applying a solid state adhesive to the partition member and attaching the partition member to the cushion member by placing the partition member at a predetermined position on the cushion member or on the headrest cover, and then heating the partition member and the cushion member or the headrest cover, such that the partition member is bonded to the cushion member or to the headrest cover without positional deviation.

Figure 10:
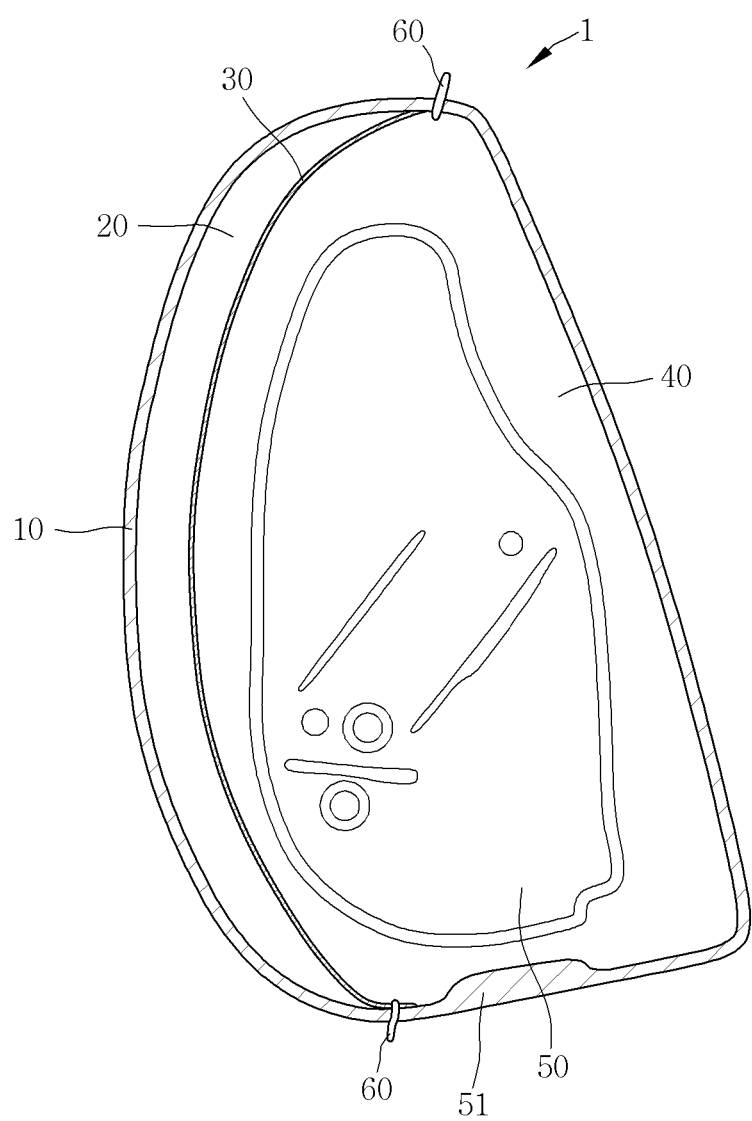
FIGS. 10 and 11 are cross-sectional views showing that a partition member is attached to the cushion member and/or a headrest cover.
Figure 11:
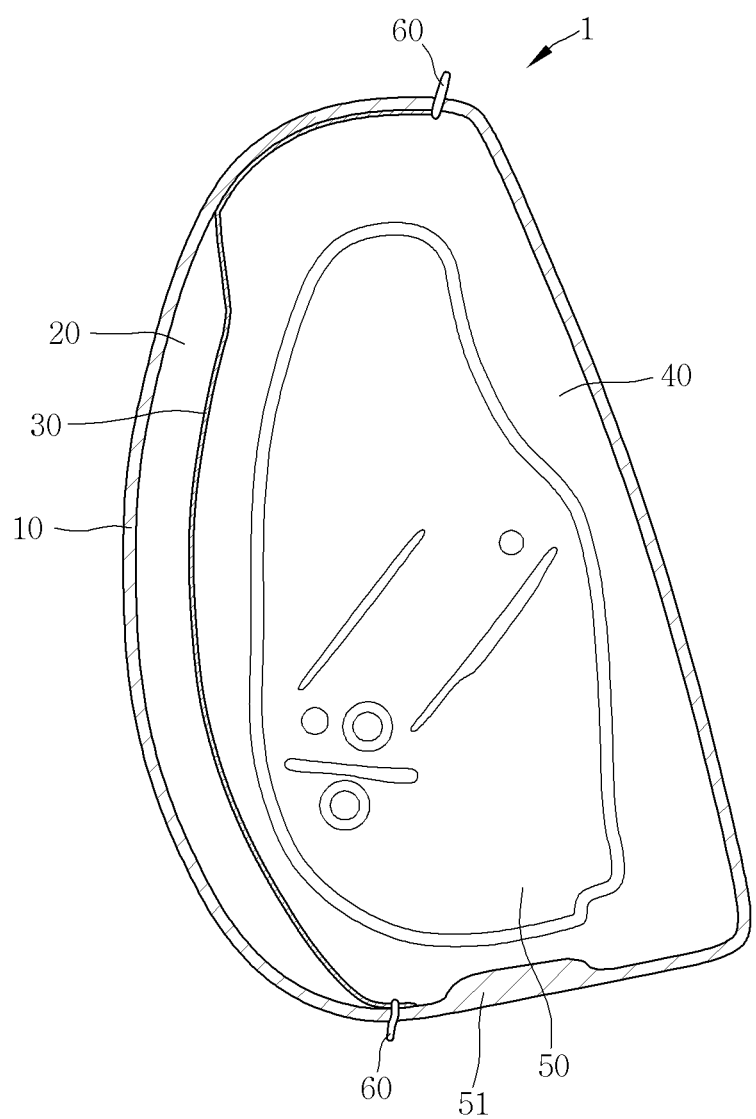

As shown in FIG. 10, although the partition member 30 is attached so as to cover the cushion member, the sewing line 60 and the attachment portion of the partition member may be misaligned from each other depending on the design of the headrest. However, in such a case, an outer surface of the headrest is wrinkled or grooved. In this case, as shown in FIG. 11, the partition member 30 may be provided so as to cover both the cushion member and the headrest cover, and thus it is possible to eliminate the phenomenon that the outer surface of the headrest is wrinkled or grooved.

Then, the cushion member 20 is attached to the headrest cover 10.

The headrest cover 10 is inverted such that inside and outside thereof are reversed, and then the cushion member 20 is attached to the portion where the user's head is rested.

Here, the attaching of the cushion member to the headrest cover is performed by applying a solid state adhesive and attaching the cushion member to the headrest cover by placing the cushion member at a predetermined position on the headrest cover, and then heating the cushion member and the headrest cover, such that the cushion member is bonded to the headrest cover without positional deviation.

In the attaching of the partition member to the cushion member and the attaching of the cushion member to the headrest cover, since the member has adhesive force, the position adjustment cannot be performed once attached, and thus defects tend to occur. Moreover, the members attached to each other have different elongations, and thus wrinkles or loosening tends to occur.

Thus, the adhesive may be the solid state adhesive. In other words, the solid state adhesive in which no adhesive force is generated before heat is applied is applied to the member, the member to be attached is placed in the predetermined position, and then the member is heated, thereby being bonded without positional deviation.

In addition, since the headrest and the cushion member differ from each other in elongation as described above, defects such as slippage and loosening are likely to occur when the conventional thermal bonding apparatus is used.

In the present invention, the cushion member is prebonded to the headrest cover by heating at a high temperature for a short period of time in vertical thermal bonding apparatuses 101 and 102.

Then, in order to minimize heat transfer to the fabric, the cushion member and the headrest cover that are pre-bonded to each other are finally bonded to each other by pressurizing the cushion member and the headrest cover after drawing the cushion member and the headrest cover out of the vertical thermal bonding apparatus by using a transfer device 103.

Then, air is blown to quickly cool the headrest.

Meanwhile, the method of manufacturing the integrated foam type headrest having different hardness parts according to the present invention can be applied to a leather product headrest.

When the headrest cover is made of natural leather, the cushion member may be attached to a sponge used for the headrest cover, and then the leather is sewn together with the edge of the cushion member. The reason is that, it hardens when attached to the sponge due to the nature of the leather.

Then, the headrest cover to which the cushion member is attached is inverted back to its original state such that the inner and outer sides thereof are reversed.

Then, the stay frame 50 is inserted into the headrest cover with the cushion member attached thereto, and the headrest cover is fixed to the headrest mold.

Then, the end cover is mounted to the headrest cover to block the opening provided at the lower end portion of the headrest cover.

Then, the foam material is injected into the headrest cover and is foamed. At this time, the foam material, which expands at the time of foaming, presses the partition member, such that the partition member can be attached to the headrest cover while preventing the foam material from penetrating into the cushion member.

Then, the headrest is demolded when the foam material is cured after a certain period of time has elapsed.

Thus, when the headrest is manufactured, the cushion member having a certain softness is provided at a cushion part of the headrest where the user's head is rested, and a main body of the headrest is formed by foaming the foam material, such that the cushion member and the headrest cover can be manufactured in an integrated foam type, thus providing a headrest having parts with different hardnesses.

The method of manufacturing the headrest according to the present invention is simple in manufacturing and can reduce manufacturing costs by reducing assembly cost. Further, since the soft cushion member is provided at the cushion part where the user's head is rested, and the main body of the headrest is formed by foaming the foam material, it is possible to secure user comfort and stability.

Although a preferred embodiment of the present invention has been described for illustrative purposes, those skilled in the art will appreciate that various modifications, additions and substitutions are possible, without departing from the scope and spirit of the invention as disclosed in the accompanying claims.

The invention claimed is:

1. An integrated foam type headrest having different hardness parts, the headrest comprising:
   a headrest cover;
   a cushion member provided at a portion of the headrest cover where a user's head is rested, the cushion member being made of a material that has high elongation and low rebound resilience, wherein the cushion member is bonded to an inner surface of the headrest cover before foaming of a foam material;
   a partition member that is bonded to an inner surface of the cushion member and is configured to prevent the foam material from penetrating into the cushion member;
   a stay frame configured to fix the headrest to the seat; and
   a foam material that surrounds the stay frame and that is filled in the headrest cover by foaming.

2. The headrest of claim 1, wherein the headrest cover is made of natural leather or artificial leather, and the cushion member is bonded to the headrest cover by sewing rather than adhesive only at an edge of the cushion member.

3. The headrest of claim 1, wherein the partition member is made of a heat-resistant material, and has a thickness of 20 to 50 μm.

4. The headrest of claim 1, wherein the cushion member is a memory foam having high elongation and a rebound resilience of 5 to 15%, or is a sponge having high elongation and a rebound resilience of equal to or less than 50%.

5. The headrest of claim 4, wherein the partition member is made of a heat-resistant material, and has a thickness of 20 to 50 μm.

6. A method of manufacturing an integrated foam type headrest having different hardness parts, the method comprising:
   preparing a cushion member provided at a portion of the headrest where a user's head is rested, the cushion member comprising one of a memory foam and a sponge having high elongation and low rebound resilience;
   attaching a partition member to the cushion member, the partition member being provided between the cushion member and the foam material to be foamed, thereby preventing the foam material from penetrating into the cushion member;
   attaching the cushion member to an inner surface of a headrest cover;
   inserting a stay frame into the headrest cover after the cushion member is attached to the inner surface of the headrest cover, and inserting and fixing the headrest cover to a headrest mold;
   coupling an end cover to the headrest cover; and
   injecting a foam material into the headrest cover and foaming the cushion member and the headrest integrally, followed by demolding.

7. The method of claim 6, wherein in the attaching of the custom member to the inner surface of the headrest cover, a solid state adhesive is applied and attached to the cushion member and the cushion member is placed at a predetermined position on the headrest cover, and then the cushion member and the headrest cover are heated, such that the cushion member is bonded to the headrest cover without positional deviation.

8. The method of claim 7, wherein in the attaching of the partition member, a solid state adhesive is applied and attached to the partition member and the partition member is placed at a predetermined position on the cushion member or the headrest cover, and then the partition member and the cushion member are heated or the headrest cover is heated, such that the partition member is bonded to the cushion member without positional deviation.

9. The method of claim 7, wherein the attaching of the cushion member to the headrest cover comprises:
   pre-bonding the cushion member to the headrest cover by heating at a high temperature for a short period of time in a vertical thermal bonding apparatus; and
   final-bonding the cushion member and the headrest cover to each other by pressurizing the cushion member and the headrest cover after drawing the cushion member and the headrest cover that are pre-bonded to each other out of the vertical thermal bonding apparatus by using a transfer device, followed by cooling.

\* \* \* \* \*